(12) United States Patent
DeMers et al.

(10) Patent No.: US 8,166,419 B2
(45) Date of Patent: Apr. 24, 2012

(54) APPARATUS AND METHOD FOR NAVIGATING AMONGST A PLURALITY OF SYMBOLS ON A DISPLAY DEVICE

(75) Inventors: Robert E. DeMers, Elk River, MN (US); Mel White, Rustington (GB)

(73) Assignee: Honeywell International Inc., Morristown, NJ (US)

( * ) Notice: Subject to any disclaimer, the term of this patent is extended or adjusted under 35 U.S.C. 154(b) by 935 days.

(21) Appl. No.: 12/022,734

(22) Filed: Jan. 30, 2008

(65) Prior Publication Data

US 2009/0193362 A1 Jul. 30, 2009

(51) Int. Cl.
*G06F 3/048* (2006.01)

(52) U.S. Cl. .................................. 715/835; 701/208

(58) Field of Classification Search .................. 715/835; 701/208
See application file for complete search history.

(56) References Cited

U.S. PATENT DOCUMENTS

| | | | | |
|---|---|---|---|---|
| 5,528,735 | A * | 6/1996 | Strasnick et al. | 345/427 |
| 5,850,206 | A * | 12/1998 | Kashiwagi | 345/418 |
| 6,278,940 | B1 * | 8/2001 | Endo | 701/209 |
| 6,339,440 | B1 | 1/2002 | Becker et al. | |
| 6,404,420 | B1 | 6/2002 | Klein et al. | |
| 6,567,746 | B2 * | 5/2003 | Kuroda et al. | 701/212 |
| 6,587,787 | B1 * | 7/2003 | Yokota | 701/212 |
| 6,664,989 | B1 * | 12/2003 | Snyder et al. | 715/856 |
| 6,833,811 | B2 * | 12/2004 | Zeitfuss et al. | 342/357.31 |
| 6,983,203 | B1 * | 1/2006 | Wako | 701/208 |
| 7,783,427 | B1 * | 8/2010 | Woodell et al. | 701/301 |
| 2004/0257340 | A1 * | 12/2004 | Jawerth | 345/157 |
| 2006/0262218 | A1 | 11/2006 | Querre | |
| 2007/0226261 | A1 * | 9/2007 | Urita | 707/104.1 |
| 2007/0256026 | A1 * | 11/2007 | Klassen et al. | 715/764 |
| 2009/0055774 | A1 * | 2/2009 | Joachim | 715/810 |

FOREIGN PATENT DOCUMENTS

EP 1637976 A1 3/2006

OTHER PUBLICATIONS

Anonymous: "GPSMAP 3006C/3010C Owner's Manual, Revision G," Garmin website, Nov. 2007, p. 12, XP002534907, retrieved on Jan. 7, 2009. Retrieved from the Internet: <URL:www.garmin.com/manuals/GPSMAP3006C_3010C_OwnersManual.pdf>.
Extended European search report for Application No. 09151162, mailed on Jul. 15, 2009.

* cited by examiner

*Primary Examiner* — Chat Do
*Assistant Examiner* — Phenuel Salomon
(74) *Attorney, Agent, or Firm* — Ingrassia Fisher & Lorenz, P.C.

(57) ABSTRACT

A display device is provided for selecting a plurality of selectable symbols on an electronic display. The display device comprises an electronic display that displays a plurality of selectable symbols, a user input control device, and a processor coupled to the electronic display and the user input control device. The processor is configured to select one of the plurality of selectable symbols based on a comparison of at least two of the plurality of selectable symbols according to a predetermined priority scheme in response to a single activation of the user input control device. In addition, the processor is further configured to select an additional selectable symbol from the plurality of selectable symbols in accordance with a predetermined sequence upon further activation of the input control device.

18 Claims, 4 Drawing Sheets

APPARATUS AND METHOD FOR NAVIGATING AMONGST A PLURALITY OF SYMBOLS ON A DISPLAY DEVICE

FIELD OF THE INVENTION

The present invention generally relates to electronic display devices, and more particularly relates to an apparatus and method for navigating amongst a plurality of symbols on a display device.

BACKGROUND OF THE INVENTION

Electronic display devices have long been configured to display symbols or icons that may be selected by a user in order to access additional information and/or functions on the device. For example, many personal computers utilize software that displays a graphical user interface to the user. This graphical user interface may display a plurality of icons that represent software programs that are available on the computer. To access these software programs, the user selects one of the icons utilizing an input control device (e.g., a cursor control device), such as a mouse, trackball, or touchpad controller, to maneuver a cursor over the icon. The user may then activate the icon by, for example, pressing a button on the input control device. Graphical electronic display devices of this kind enhance the user's ability to efficiently use the features of a particular device.

Graphical user displays are commonly used in conjunction with electronic mapping devices on aircraft. Such electronic mapping devices may use Global Positioning System ("GPS") technology to display a map of a particular area. Often, these mapping devices also display symbols on the map that represent locations or entities that are of interest in the area. As described above, an input control device, such as a cursor control device, may be utilized to select one of these symbols by positioning a cursor over it and pressing a button on the input control device. For example, an electronic mapping device that is intended for use on an aircraft may display selectable symbols representing airports, other aircraft, vehicles, and/or ships. The pilot, copilot, or other aircraft personnel, may select and activate software in order to obtain important flight information. Sometimes, however, flight conditions may make it difficult for a pilot, copilot, or other aircraft personnel to maneuver the cursor with enough precision to accurately select a particular icon.

Accordingly, it is desirable to have an apparatus for selecting symbols on a display device that does not require the user to maneuver a cursor precisely over a desired symbol. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A display device is provided for selecting a plurality of selectable symbols on an electronic display. The display device comprises an electronic display that displays a plurality of selectable symbols, a user input control device, and a processor coupled to the electronic display and the user input control device. The processor is configured to select one of the plurality of selectable symbols based on a comparison of at least two of the plurality of selectable symbols according to a predetermined priority scheme in response to a single activation of the user input control device. In addition, the processor is further configured to select an additional selectable symbol from the plurality of selectable symbols in accordance with a predetermined sequence upon further activation of the input control device.

A method is also provided for selecting a plurality of selectable symbols on an electronic display device. The method comprises displaying a plurality of selectable symbols and a movable cursor on the electronic display, and selecting one of the plurality of selectable symbols based on the relative positions of at least two of the plurality of selectable symbols in response to a single input from a user input control device. In addition, the method further comprises receiving an additional input from the user input control device and selecting a different selectable symbol from the plurality of selectable symbols in accordance with a predetermined sequence.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
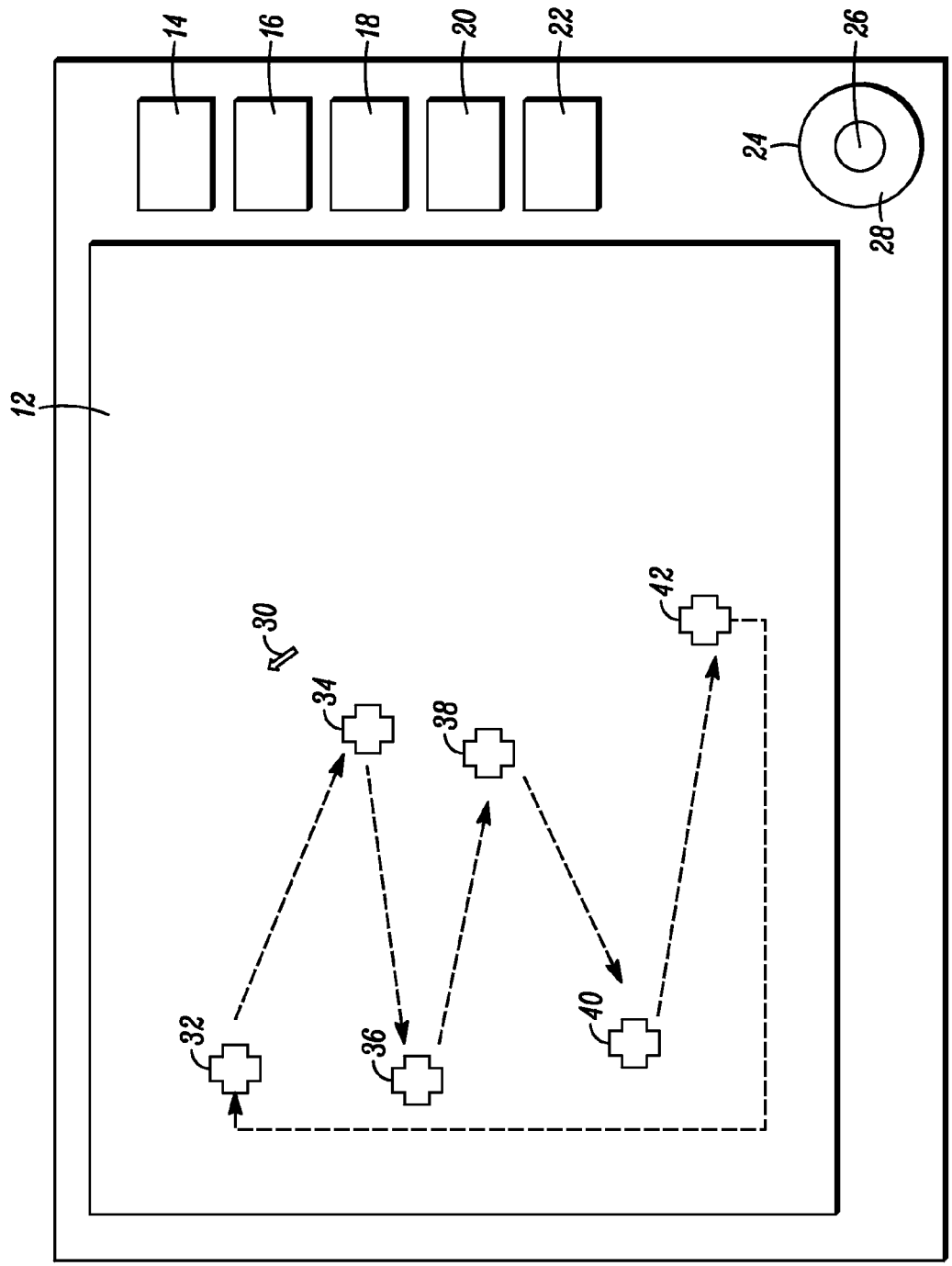
FIG. 1 illustrates an exemplary image that is displayed on a display device according to a first embodiment of the invention.

FIG. 1 illustrates an exemplary image that is displayed on a display device 10 according to a first embodiment of the invention. The display device 10 includes an electronic display 12, a plurality of user input controls (e.g., buttons) 14-22 that allow the user to interact with various features of the display device 10, and a user input control device 24 comprising a cursor input control 26 and a symbol selection control 28. In one embodiment, the display device 10 is an electronic mapping device, suitable for use on an aircraft, a vehicle, a ship, or the like. In this embodiment, the display device 10 is configured to display a map depicting geographical features, such as cities and/or bodies of water, on the display 12.

The electronic display 12 is configured to display images and visual indicators to the user. The display 12 may be a comprised of a cathode ray tube, liquid crystal display, plasma display, or any other display suitable for displaying the images described herein. As shown in FIG. 1, the image rendered on the display 12 includes a cursor 30 and a plurality (e.g., six) of symbols 32-42. The cursor 30 is movable over at least the portion of the display 12 that is populated by the symbols 32-42. As described below, the user may maneuver the cursor 30 to select one of the symbols 32-42 rendered on the display 12.

Figure 2:
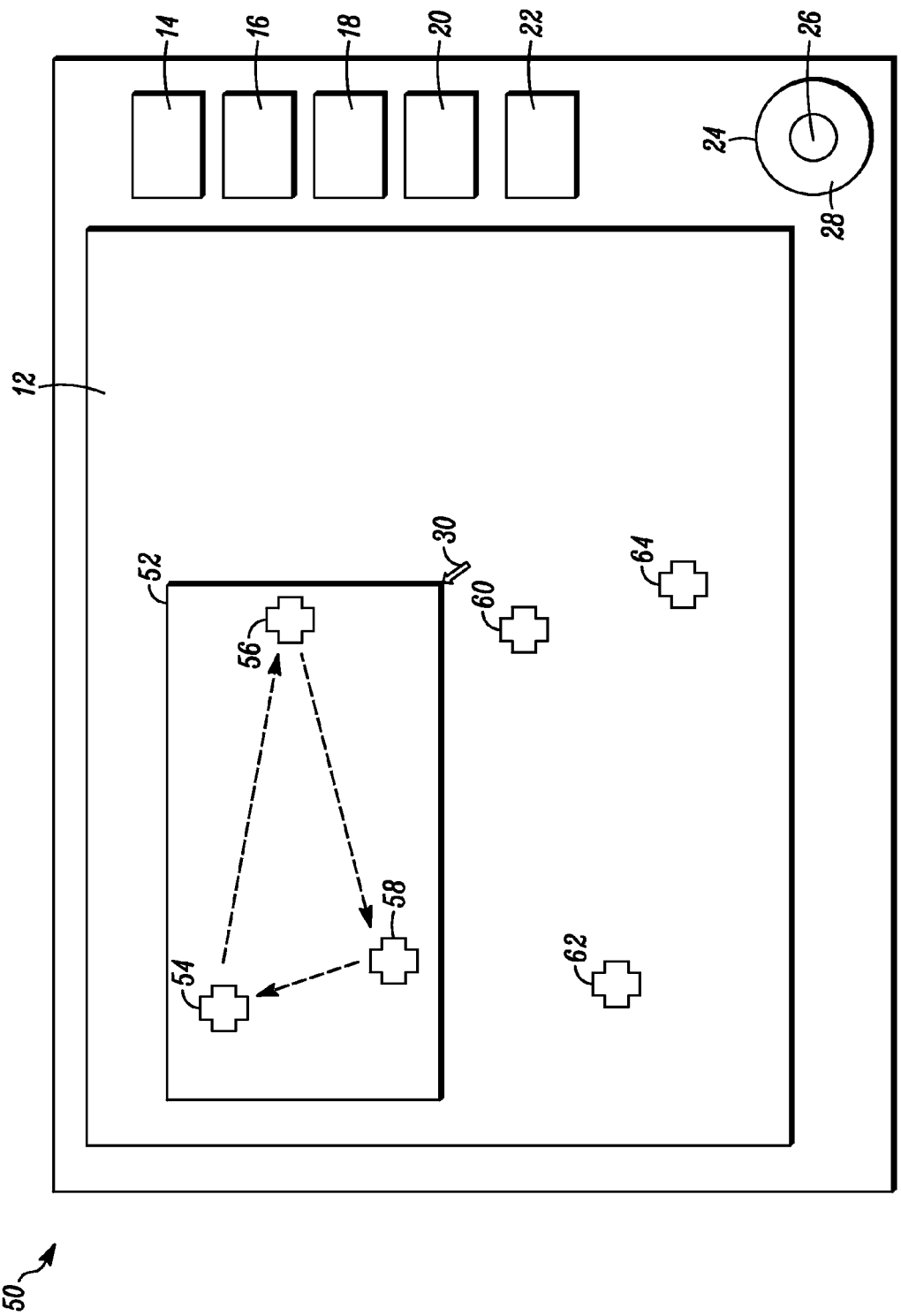
FIG. 2 illustrates an exemplary image that is displayed on a display device according to a second embodiment of the invention.

FIG. 2 illustrates an exemplary image that is displayed on a display device 50 according to a second embodiment of the invention. The display 12 of this embodiment includes the cursor 30, a plurality of symbols 54-64 having substantially the same characteristics and functionalities described below with regard to symbols 32-42 (FIG. 1), and a boundary designator 52 that encloses a desired subset 54-58 of the plurality of symbols 54-64. As described below, this second embodiment permits the user to sequentially select among only the desired subset 54-58 of the symbols 54-64 on the display 12. It should be noted that although the depicted boundary designator 52 is shaped as a rectangle, other embodiments may include boundary designators 52 having different shapes.

The boundary designator 52 is positioned on the display 12 in response to input from the user. For example, a boundary designator 52 having a predetermined size and shape may be generated and positioned at a predetermined location on the display 12 so that it encloses a subset of the plurality of symbols 54-64 in response to input from one of the user input controls 14-22, or another input device. In this example, additional actuation of one of the user input controls 14-22, or other input device, may cause the position of the boundary designator 52 to change to a different predetermined location on the display 12. In other embodiments, the position of the boundary designator 52 on the display 12 may be based on the position of the cursor 30 when additional input from the user is received. For example, a boundary designator 52 having a predetermined size and shape may be positioned at the location of the cursor 30 in response to input from one of the user input controls 14-22, or another input device. In this example, movement of the cursor and/or an additional actuation of the user input controls 14-22, or other input device, may be used to change the size, shape, and/or position of the boundary designator 52.

Returning to FIG. 1, the symbols 32-42 are individually selectable and represent additional functionality and/or information that can be accessed on the display device 10. Each of the symbols 32-42 may be selected by positioning the cursor 30 so that it overlaps with the symbol. In some embodiments, symbol selection may be indicated by changing the appearance (e.g., changing its color or size) of a symbol 32-42. After a symbol 32-42 is selected, the user may activate the information or functionality that it represents by operating an input control device, such as one of the user input controls 14-22.

In the case of an electronic mapping device on-board an aircraft, the symbols 32-42 may represent possible destinations for an aircraft that the pilot may select in order to access additional information about each destination. Alternatively, the symbols 32-42 may represent ships or other aircraft in the area, and the user of the display device 10 may select one of the symbols in order to obtain additional information about a particular aircraft or ship. The display device 10 may use GPS technology to accurately display a map and position the symbols 32-42 on the display 12.

As previously noted, the user input control device 24 includes two separate input controls: a cursor input control 26 and a symbol selection control 28. The user input control device 24 is configured to operate in at least two modes-a cursor control mode and a symbol selection mode. In the cursor control mode, the user utilizes the cursor input control 26 to move the cursor 30 on the display 12. This includes moving the cursor 30 so that it overlaps one of the symbols 32-42 in order to select that symbol. In addition, as depicted in FIG. 2 and described above, in some embodiments the cursor input control 26 may be used in conjunction with another input device, such as one of the user input controls 14-22, to create and position a boundary designator 52 that encloses a subset 54-58 of the symbols 54-64 on the display 12. The cursor input control 26 may be a mouse, joystick control, trackball control, a plurality of keys, buttons, or dials, or any other form of control suitable for providing input regarding the vertical and horizontal position of the cursor 30 on the display 12.

Returning to FIG. 1, in the symbol selection mode symbol selection control 28 is activated and one of the symbols 32-42 is selected based on a predetermined priority scheme or sequence. If a symbol 32-42 is already selected when symbol selection control 28 is activated, display device 10 selects another symbol 32-42 according to the predetermined priority scheme or sequence. In this manner, the user of the display device 10 may utilize the symbol selection control 28 to navigate through a plurality of symbols 32-42 by sequentially selecting each of them without having to maneuver the cursor 30. This makes the symbol selection control 28 particularly useful when it is difficult to use the cursor input control 26 with enough precision to maneuver the cursor 30 directly over a desired symbol. Further, as depicted in FIG. 2, in some embodiments the symbol selection control 28 is activated to select amongst a subset 54-58 of a plurality of symbols 54-64 that are enclosed within a boundary designator 52 according to a predetermined priority scheme or sequence.

Returning again to FIG. 1, the symbol selection control 28 may be configured to select the next symbol in a predetermined sequence or the previous symbol in the predetermined sequence. To this end, the symbol selection control 28 may be comprised of a rotating dial that can be incrementally rotated in opposing directions. Rotating the dial in a first direction causes the next symbol 32-42 in the sequence to be selected, and rotating the dial in the opposition direction causes the previous symbol 32-42 to be selected. It should be noted, however, that although this embodiment has been described in connection with a rotary dial, the symbol selection control 28 may be comprised of a rocker or toggle switch, one or more keys (e.g., one or more of the user input controls 14-22), or any other control device that is suitable for selecting the next symbol 32-42 or the previous symbol 32-42 in a given sequence.

Figure 3:
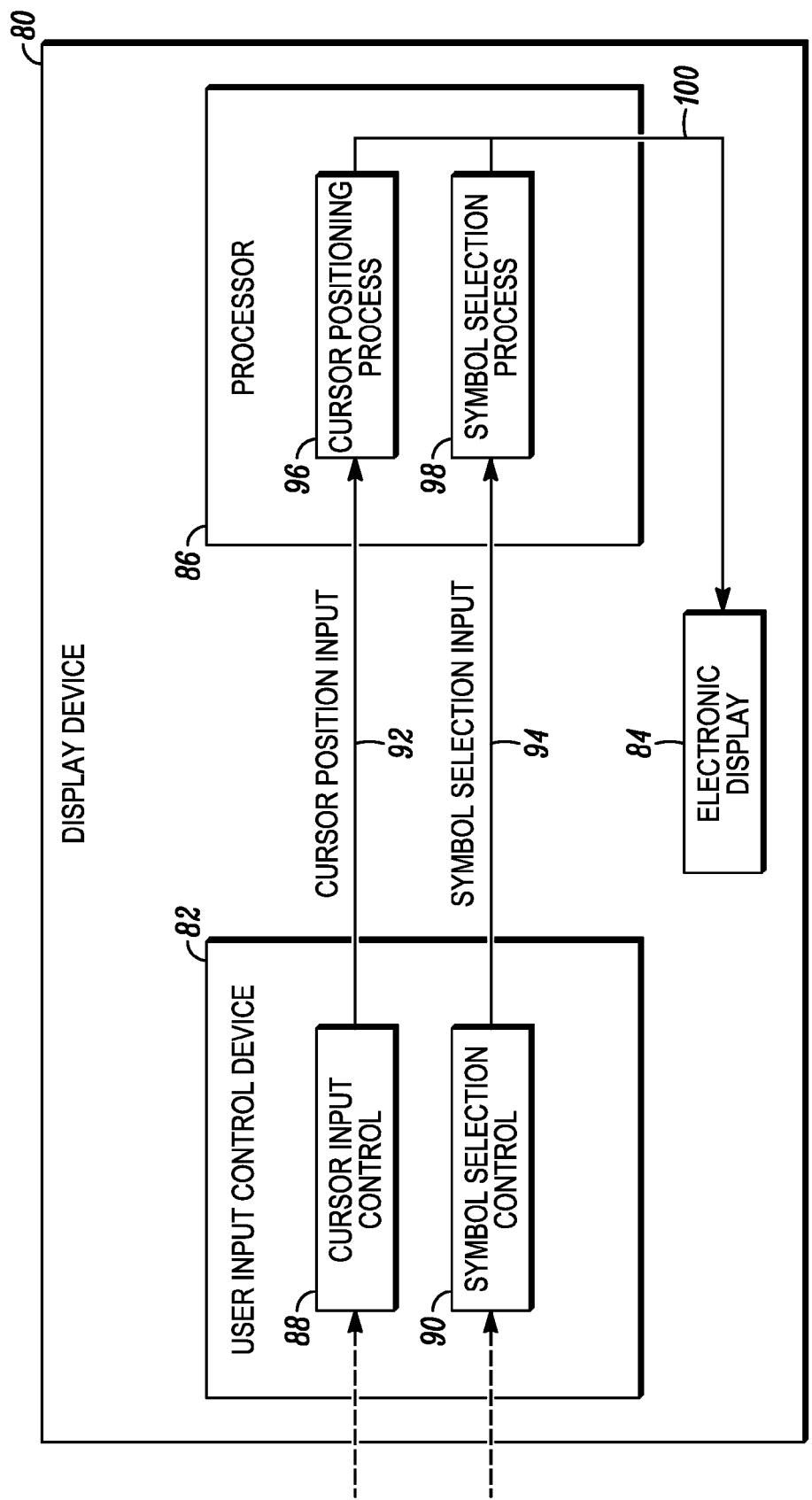
FIG. 3 is a block diagram of a display device configured to select among a plurality of displayed symbols in accordance with a predetermined priority scheme.

FIG. 3 is a block diagram of a display device 80 configured to select among a plurality of displayed symbols in accordance with a predetermined priority scheme or sequence. The display device 80 includes a user input control device 82, an electronic display 84, and a processor 86. The user input control device 82 is coupled to the processor 86 and includes a cursor input control 88 and a symbol selection control 90. The user input control device 82 receives user inputs via the cursor input control 26 or the symbol selection control 28 (as shown in FIG. 1), which are applied respectively to the cursor input control 88 and the symbol selection control 90. The user input control device 82 provides cursor position input 92 and symbol selection input 94 to the processor 86.

The processor 86 can be a programmable logic control system (PLC), a microprocessor, or any other type of electronic controller known by those skilled in the art. It may be comprised of one or more components of a digital and/or analog type and may be programmable by software and/or firmware, a hardwired state-machine, a combination of these, or any other method known to those skilled in the art. The processor 86 is coupled to the user input control device 82 and to the electronic display 84. As shown in FIG. 3, the processor 86 performs a cursor positioning process 96 and a symbol selection process 98. The cursor positioning process 96 determines the correct position of the cursor 30 on the electronic display 12 (shown in FIG. 1) based on the cursor position input 92. The symbol selection process 98 selects a symbol 32-42 (FIG. 1) based on the symbol selection input 94. The symbol selection process 98 will be described in greater detail below in connection with FIG. 4.

In one embodiment, the processor 86 also generates and positions a boundary designator 52 (FIG. 2) that encloses a desired subset 54-58 of a plurality of symbols 54-64 (FIG. 2) based on the cursor position input 92 and/or another input, such as input received from the user input controls 14-22 (FIG. 2). In this embodiment, the symbol selection process 98 selects only those symbols 54-58 that are enclosed within the boundary designator 52 (FIG. 2).

The processor 86 provides display input data 100 to the electronic display 84 and the electronic display 84 is configured to display graphic images and visual indicators based on the display input data 100. The display input data 100 includes information about the position of the cursor 30 (FIG. 1) and whether one of the symbols 32-42 (FIG. 1) is selected. Further, in some embodiments the display input data 100 includes information regarding the size and position of a boundary designator 52 (FIG. 2) on the electronic display 12 (FIG. 2). Finally, the display input data 100 may also direct the electronic display 84 to display a map and to position the symbols 32-42 (FIG. 1) to represent locations or entities of interest.

Figure 4:
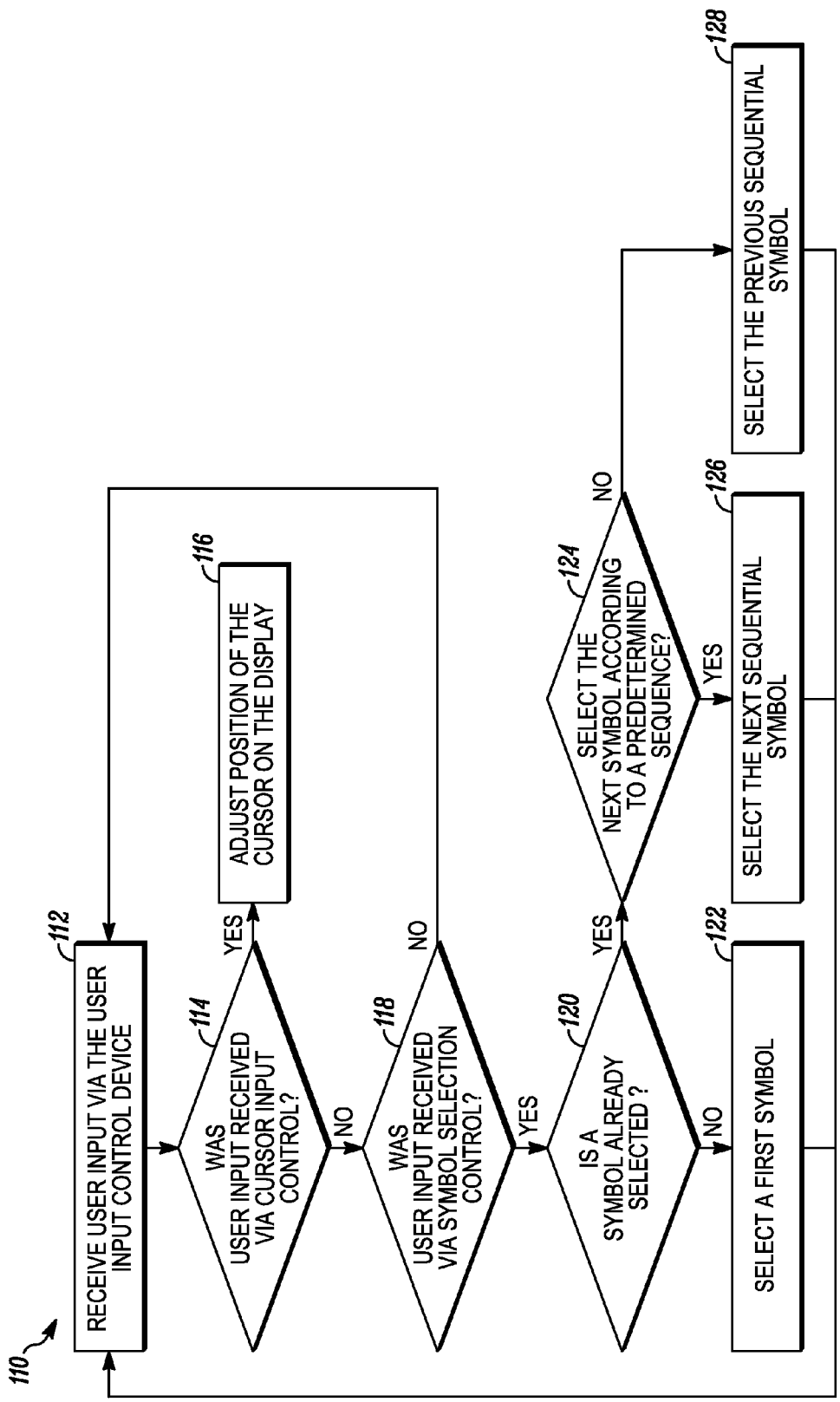
FIG. 4 is a flowchart of an exemplary method for sequentially selecting among plurality of symbols on a display device.

FIG. 4 is a flowchart of an exemplary method 110 for sequentially selecting among a plurality of symbols on a display device (e.g., the display device 80 of FIG. 3). It is to be understood that the various steps described in conjunction with FIG. 4 may be performed in different orders than the illustrated and described order, and/or some steps may be performed in parallel with each other.

The exemplary method 110 begins with step 112, in which the display device receives user input via a user input control device (e.g., the user input control device 82 of FIG. 3). Next, during step 114, a processor (e.g., the processor 86 of FIG. 3) determines whether the user input was received via a cursor input control (e.g., the cursor input control 88 of FIG. 3). If the user input was received via the cursor input control, the processor adjusts the position of a cursor (e.g., the cursor 30 in FIG. 1) on an electronic display (e.g., the electronic display 12 of FIG. 1) during step 116. Further, as described previously, in some embodiments the cursor input control may also be used to create and position a boundary designator (e.g., the boundary designator 52 of FIG. 2) so that it encloses a subset of the symbols (e.g., the symbols 54-58 of FIG. 2) on the electronic display. In such embodiments, processor may create and position this boundary designator during step 116 as well.

If the user input was not received via the cursor input control, then the processor determines whether the user input was received via a symbol selection control (e.g., the symbol selection control 90 in FIG. 3) during step 118. If the processor determines, during step 118, that the user input was not received via the symbol selection control, then the user input is not relevant and the method 110 returns to step 112.

Conversely, if the user input was received via the symbol selection control, the processor determines whether a symbol (e.g., one of the symbols 32-42 of FIG. 1) is selected on the electronic display during step 120. If no symbol is selected, the processor selects a symbol based on a predetermined priority scheme in step 122. In some embodiments, the processor selects a symbol based on a comparison of at least two of the symbols according to the predetermined priority scheme. For example, the predetermined priority scheme may depend on the relative positions of the at least two symbols on the electronic display. Returning to FIG. 1 the display device 10 may select the symbol 32 that is closest to the top left corner of the display 12 by comparing the relative positions of at least the two closest symbols 32, 36 to the top left corner of the display. Similarly, the device might select the symbol 38 that is closest to the center of the display 12 by comparing the relative positions of at least the two closest symbols 34, 38 to the center of the display 12. Alternatively, the display device 10 may select the symbol 34 that is closest to the cursor 30 on the display 12 by comparing the relative positions of at least the two closest symbols 32, 34 to the cursor 30.

The predetermined priority scheme may also depend on factors associated with the objects (e.g., ships or aircraft) represented by each the symbols. For example, as described above, in one embodiment the display includes a map of an area and the symbols represent ships that are located within the area depicted by the map. In this embodiment, the predetermined priority scheme may depend on the size of the ships and the display device may select the appropriate symbol by comparing the sizes of the ships represented by at least two of the symbols on the display.

Further, with regard to FIG. 2, in embodiments where the display device 50 is configured to create a boundary designator 52 that encloses a desired subset 54-58 of the symbols 54-64 on the display 12, the display device 50 selects a symbol from this subset of symbols 54-58 according to a predetermined priority scheme during step 122. For example, the display device 50 may select the symbol 54 that is closest to the top left corner of the boundary designator 52.

If, on the other hand, the processor determines that a symbol is already selected (e.g., the cursor is positioned so that it overlaps with a symbol) during step 120, then the method proceeds to 124. During step 124, the processor determines, based on the user input, whether to select the next symbol in a predetermined sequence. In the embodiment illustrated in FIG. 1 the predetermined sequence, as depicted by the dotted arrows, is based on the distance of the symbols 32-42 from the top of the display 12. Further, if multiple symbols are positioned an equal distance from the top of the display 12, the priority of those symbols is resolved according to their distance from the left edge of the display 12. In other embodiments, the predetermined sequence is based on the distance of the symbols 32-42 from the center of the display 12 or from the position of the cursor 30 after the last input from the cursor input control (Step 116). In still other embodiments, the predetermined sequence is based on factors (e.g., size and location) associated with the objects represented by the symbols, as described above.

With regard to FIG. 2, the predetermined sequence is determined by considering only the desired subset of symbols 54-58 that are enclosed by the boundary designator 52. For example, as depicted by the dotted arrows in FIG. 2, the predetermined sequence may be based on the distance of the symbols 54-58 from the top of the boundary designator 52.

During step 126, the processor selects the next sequential symbol. For example, according to the sequence of FIG. 1, if symbol 34 were selected when the display device 10 receives the user input, then the display device 10 selects symbol 36 during step 126. Further, the sequence of FIG. 1 may be ordered so that if the last symbol 42 is selected when the display device 10 receives the user input, the display device 10 will select the first symbol 32 in the sequence during step 126.

With regard to FIG. 2, if symbol 54 is selected when the display device 50 receives the user input, then the display device 50 selects symbol 56 during step 126. In addition, the sequence of FIG. 2 may be ordered so that if the last symbol 58 that is enclosed the boundary designator 52 is selected when the display device 50 receives the user input, the display device 50 selects the first symbol in the sequence (e.g., the symbol 54 that is closest to the top of the boundary designator 52). Other sequences, including those discussed above with regard to step 124, may also be used during step 126.

If the processor determines, during step 124, that the next sequential symbol should not be selected, the method 110 proceeds to step 128. During step 128 the processor selects the previous symbol according to the sequence. Returning to FIG. 1, if symbol 34 were selected when the display device 10 receives the user input, then the display device 10 selects symbol 32 during step 128. In addition, in some embodiments, if the first symbol 32 in the sequence of FIG. 1 is selected when the display device 10 receives the user input, the display device 10 selects symbol 42 during step 128. Further, with regard to FIG. 2 if symbol 56 were selected when the display device 50 receives the user input, then the display device 50 selects symbol 54 during step 128. Other sequences, including those discussed above with regard to step 124, may also be used during step 128. Finally, it should be noted that in some embodiments the symbol selection control 28 is not configured to provide both a next and a previous symbol selection input. In such embodiments, the user input is treated as a next symbol selection input, in the manner described above.

Upon the completion of steps 122, 126, or 128, the display device returns to step 112 and waits for additional input from the user input control device. Thus, the method 110 permits the user to switch back and forth between the cursor input control and the symbol selection control at any time. For example, returning to FIG. 1, in an embodiment in which the display device 10 selects the symbol 32 that is closest to the cursor 30 during step 122, the user may utilize the cursor input control to position the cursor 30 near a group of symbols and then use the symbol selection input control to select among those symbols according to the predetermined sequence. Further, the user may return to the cursor input control to maneuver the cursor 30 near a different group of symbols and then use the symbol selection control to select among each of these symbols according to the predetermined sequence.

While at least one exemplary embodiment has been presented in the foregoing detailed description of the invention, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A display device, comprising:
an electronic display that displays a plurality of selectable symbols each symbol representing a physical object;
a user input control device configured to define a boundary designator enclosing a subset of the plurality of selectable symbols; and
a processor coupled to the electronic display and to the user input control device, the processor configured to select one of the subset of the plurality of selectable symbols based on relative positions of at least two of the subset of selectable symbols and relative sizes of the physical objects represented thereby in response to a movable cursor on the electronic display resulting from a single activation of the user input control device.

2. The display device of claim 1, wherein the processor is further configured to:
cause the electronic display to display a map of an area; and
position the plurality of selectable symbols to represent entities of interest in the area.

3. The display device of claim 1, wherein the processor is further configured to select a different selectable symbol from the subset of the plurality of selectable symbols in accordance with a predetermined sequence upon further activation of the user input control device.

4. The display device of claim 3, wherein:
the processor is further configured to:
cause the electronic display to display the movable cursor, and
select a selectable symbol from the subset of the plurality of selectable symbols by positioning the movable cursor so that the movable cursor overlaps with the selectable symbol on the electronic display.

5. The display device of claim 3, wherein the predetermined sequence is based on the relative positions of the subset of the plurality of selectable symbols on the electronic display.

6. The display device of claim 1, wherein:
the user input control device is further configured to provide:
a first input, resulting in the selection of a next selectable symbol from the subset of the plurality of selectable symbols in accordance with a predetermined sequence, and
a second input, resulting in the selection of a previous selectable symbol from the subset of the plurality of selectable symbols in accordance with the predetermined sequence; and
the processor is further configured to select:
the next selectable symbol from the subset of the plurality of selectable symbols in accordance with the predetermined sequence upon further activation of the user input control device in the form of the first input; and
the previous selectable symbol from the subset of the plurality of selectable symbols in accordance with the predetermined sequence upon further activation of the user input control device in the form of the second input.

7. The display device of claim 6, wherein the user input control device is comprised of a rotary dial and rotating the rotary dial in a first direction comprises a first input and rotating the rotary dial in the opposite direction comprises a second input.

8. The display device of claim 6, wherein the user input control device is comprised of a toggle switch and pressing the toggle switch in a first direction comprises a first input and pressing the toggle switch in the opposite direction comprises a second input.

9. The display device of claim 6, wherein the user input control device is comprised of a pair of keys and pressing a first key comprises a first input and pressing a second key comprises a second input.

10. A method for selecting a plurality of selectable symbols on a display device, each symbol representing a physical object, comprising:
displaying the plurality of selectable symbols on an electronic display;

receiving a single input from a user input control device configured to define a boundary designator enclosing a subset of the plurality of selectable symbols; and selecting one of the plurality of selectable symbols based on relative positions of at least two of the plurality of selectable symbols and relative sizes of the physical objects represented thereby on the electronic display.

11. The method of claim 10, further comprising displaying a movable cursor and wherein the selecting step is further comprised of selecting one of the plurality of selectable symbols based on the relative positions of the at least two of the plurality of selectable symbols and the movable cursor on the electronic display.

12. The method of claim 10, further comprising displaying a movable cursor and wherein the selecting steps are further comprised of positioning the movable cursor so that the movable cursor overlaps with one of the plurality of selectable symbols on the electronic display.

13. The method of claim 10, further comprising:
receiving an additional input from the user input control device; and
selecting a different selectable symbol from the plurality of selectable symbols in accordance with a predetermined sequence.

14. The method of claim 13, wherein the predetermined sequence is determined by the relative positions of the plurality of selectable symbols on the electronic display.

15. The method of claim 13, wherein:
the additional input from the user input control device is comprised of a first input configured to cause the selection of a next selectable symbol from the plurality of selectable symbols in accordance with the predetermined sequence; and
the step of selecting the different selectable symbol from the plurality of selectable symbols in accordance with the predetermined sequence is further comprised of selecting the next selectable symbol from the plurality of selectable symbols in accordance with the predetermined sequence.

16. The method of claim 13, wherein:
the additional input from the user input control device is comprised of a second input configured to result in the selection of a previous selectable symbol from the plurality of selectable symbols in accordance with the predetermined sequence; and
the step of selecting the different selectable symbol from the plurality of selectable symbols in accordance with the predetermined sequence is further comprised of selecting the previous selectable symbol from the plurality of selectable symbols in accordance with the predetermined sequence.

17. A display device, comprising:
an electronic display that displays a plurality of selectable symbols each symbol representing a physical object;
a user input control device; and
a processor coupled to the electronic display and to the user input control device, the processor configured to:
generate a boundary designator on the electronic display that encloses a desired subset of the plurality of selectable objects; and
select a selectable object from the desired subset of the plurality of selectable objects according to a predetermined priority scheme based on relative positions of at least two of the subset of selectable symbols and relative sizes of the selectable objects represented thereby in response to a single activation of the user input control device.

18. The display device of claim 17, wherein the processor is further configured to select a different selectable object from the desired subset of the plurality of selectable objects in accordance with a predetermined sequence upon further activation of the user input control device.

* * * * *